US005141557A

United States Patent [19]

Higashiyama

[11] Patent Number: 5,141,557

[45] Date of Patent: Aug. 25, 1992

[54] COLOR DEVELOPER COMPOSITION AND COLOR DEVELOPER SHEET

[75] Inventor: Shunichi Higashiyama, Yotsukaichi, Japan

[73] Assignee: Brother Kogyo Kabushiki Kaisha, Aichi, Japan

[21] Appl. No.: 553,334

[22] Filed: Jul. 17, 1990

[30] Foreign Application Priority Data

Jul. 28, 1989 [JP] Japan .......... 1-197231
Aug. 8, 1989 [JP] Japan .......... 1-205118
Aug. 9, 1989 [JP] Japan .......... 1-206034

[51] Int. Cl.$^5$ .......... C09D 11/00; B41M 5/155

[52] U.S. Cl. .......... 106/21; 503/216; 503/225

[58] Field of Search .......... 106/21; 503/216, 225

[56] References Cited

U.S. PATENT DOCUMENTS

| | | | |
|---|---|---|---|
| 4,087,284 | 5/1978 | Golden et al. | 106/21 |
| 4,137,084 | 1/1979 | Davis et al. | 106/21 |
| 4,234,212 | 11/1980 | Kato et al. | 106/21 |
| 4,374,671 | 2/1983 | Hayashi et al. | 106/21 |
| 4,566,907 | 1/1986 | Kagota | 106/21 |
| 4,950,330 | 8/1990 | Saito et al. | 106/21 |

*Primary Examiner*—Mark L. Bell
*Assistant Examiner*—Helene Klemanski
*Attorney, Agent, or Firm*—Oliff & Berridge

[57] ABSTRACT

A color developer composition exhibiting excellent color developability, resistance to yellowing and light-fastness is disclosed, which comprises a substituted or unsubstituted benzoic acid salt represented by formula (I), or a mixture of a substituted or unsubstituted benzoic acid salt represented by formula (II) and a novolak type phenol resin represented by formula (III):

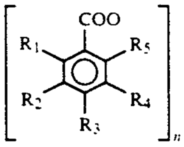

(I)

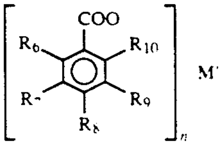

(II)

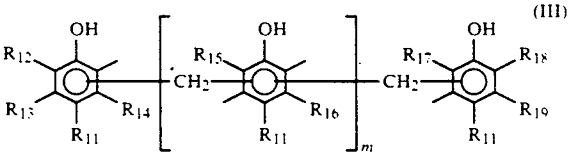

(III)

wherein $R_1$ to $R_{19}$, M, M', n, n' and M are defined in the specification.

13 Claims, No Drawings

COLOR DEVELOPER COMPOSITION AND COLOR DEVELOPER SHEET

FIELD OF THE INVENTION

This invention relates to a color developer composition and a color developer sheet for pressure-sensitive recording media.

BACKGROUND OF THE INVENTION

Hitherto, various color developers for pressure-sensitive recording media (hereafter merely referred to "color developer") have been known, for example, (1) inorganic solid acids such as acid clay and apatalgide as described in U.S. Pat. No. 2,712,507, (2) semi-synthesized solid acids having a magnesium and/or aluminum component incorporated into acid treated clay minerals as described in JP-A-58-217389 (the term "JP-A" herein used means an unexamined and published Japanese patent application) (3) substituted phenols and diphenols as described in JP-B-40-9309 (the term "JP-B" herein used means an examined Japanese patent publication), (4)p-substituted-phenol/formaldehyde copolymer as described in JP-B-42-20144, and (5) metal salts of aromatic carboxylic acids as described in JP-B-49-10856 and JP-B-52-1327. In particular, novolak phenol resins and metal salts of substituted salicylic acids, which are called organic color developers in contrast to inorganic color developers such as active clay, have been widely put in practical use for pressure-sensitive recording media, as described in JP-B-42-20144 and JP-B-51-25174. These color developers are finely ground, dispersed generally in water as a medium, mixed with inorganic pigments, adhesives and the like, and coated on paper. The thus coated paper is used as a color developer sheet, as described in JP-B-48-16341 and JP-A-54-143322.

Color developer sheets are required to have the following properties: exhibiting good color developing ability unchanged even after long storage; being free from yellowing due to exposure to radiation (e.g., daylight); and providing color images which do not easily disappear or fade upon exposure to radiation, or in contact with water or plasticizers.

Color developers and color developer sheets which have been already proposed have both merits and demerits. For instance, inorganic solid acids are inexpensive but cause yellowing or deterioration in the color developing ability upon adsorption of gas or moisture in air. Substituted phenols have insufficient color developing ability and provide color images of poor density, and they are often used in the form of a copolymer with an aldehyde such as p-phenylphenol novolak resins. The p-phenylphenol novolak resins exhibit excellent color developing ability, but their coated sheets undergo yellowing by daylight exposure or during the storage (particularly due to nitrogen oxides in air) and the color images developed markedly fade.

Metal salts of aromatic carboxylic acids have good properties with respect to color developing ability, yellowing and fading. In order to remove crystallinity, however, those conventionally used have substituents (e.g., an alkyl group, a phenyl group, a cycloalkyl group, etc.) introduced onto the benzene ring, so that they are expensive and suffer many problems in coating on a sheet due to marked bubbling when dispersed in water.

Metal salts of substituted salicylic acids are normally non-crystalline solid. Since color developers are generally coated in the form of a dispersion in water, they are highly desired to have good workability at high concentration and good dispersion stability. However, when coarse particles of the above metal salt color developer are ground in water with a ball mill, a sand grinder or the like to a desired size suitable for coating, the resulting dispersion exhibits thixotropic properties and poor fluidity, so that it is difficult to handle the dispersion. For improving its fluidity, the color developer concentration must be lowered, or a large amount of dispersants should be added but in turn, causes remarkable bubbling. Alternatively, by dissolving the metal salt color developer in an organic solvent and then dispersing it in an aqueous solution containing a dispersant with vigorous stirring, an emulsion having good fluidity can be obtained even at high concentration. Since the dispersed particles are droplets containing the organic solvent, however, the dispersed droplets become large in size during long storage of the emulsion, and consequently the emulsified state tends to corrupt at the vicinity of vessel walls, deteriorating stability of the emulsion.

SUMMARY OF THE INVENTION

An object of the present invention is to solve the above problems, i.e., to provide an inexpensive color developer composition which exhibits good color developing ability, reduced yellowing and minimized fading upon light exposure as well as good workability, no bubbling and good stability for a long storage when dispersed in water or coated on a sheet, and to provide a color developer sheet using such a color developer composition.

Another object of the present invention is to provide a color developer sheet capable of imparting to the developed images high water resistance, and chemical resistance, and gloss by heat treatment of the images, preventing alteration or improving indelibility of documents, whereby commercial value of the sheet is increased.

These objects can be achieved by a color developer composition comprising, as a main component, a substituted or unsubstituted benzoic acid salt represented by formula

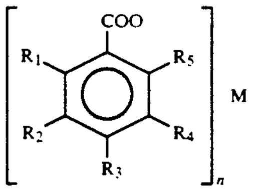

(I)

wherein $R_1$ to $R_5$ which may be the same or different, each represents a hydrogen atom, a halogen atom, a hydroxy group, or a carboxy group; M represents zinc, magnesium, calcium, aluminum, iron, cobalt, nickel, strontium, or basic ions thereof; and n is the valence of M.

The objects can also be achieved by a color developer composition comprising (i) a substituted or unsubstituted benzoic acid salt represented by formula (II):

(II)

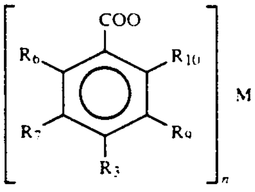

where $R_6$ to $R_{10}$ which may be the same or different, each represents a hydrogen atom, a halogen atom, a hydroxy group or a carboxy group, provided that when $R_6$ is a hydroxy group, $R_7$ to $R_{10}$ each may further represent an alkyl group having 1 to 9 carbon atoms, a cycloalkyl group, a phenyl group or an aralkyl group and the adjacent two groups of $R_7$, $R_8$, $R_9$ and $R_{10}$ may bond to form a ring; M' represents zinc, magnesium, calcium, aluminum, iron, cobalt, nickel, strontium, or basic ions thereof; and n' is an interger of 1 to 3; and (ii) a novolak phenol resin represented by formula (III):

(III)

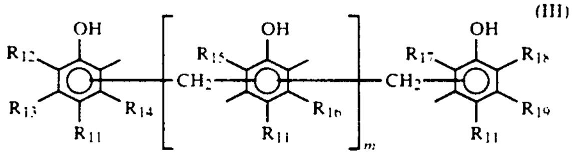

wherein $R_{11}$ to $R_{19}$ which may be the same or different, each represents a hydrogen atom, a halogen atom, an alkyl group having 1 to 9 carbon atoms, a cycloalkyl group, a phenyl group, or an aralkyl group; and m is a natural number of 1 to 9.

DETAILED DESCRIPTION OF THE INVENTION

The color developer composition containing the compound of formula (I) as a main component, which is one embodiment of the present invention, further includes 0.1 to 10 wt% of an anionic surface active agent and 0.1 to 10 wt% of a nonionic surface active agent preferably having a molecular weight of 400 or more, based on the amount of the compound of formula (I). A color developer sheet can be prepared by completely dissolving or dispersing the anionic surface active agent in pure water, dissolving or dispersing the nonionic surface active agent therein, dispersing the compound of formula (I) therein and then coating the resulting aqueous dispersion on a sheet.

The color developer composition containing the compounds of formulae (II) and (III), as the other embodiment of the present invention, further inlcude 0.1 to 10 wt% of an anionic surface active agent and 0.1 to 10 wt% of a nonionic surface active agent preferably having a molecular weight of 400 or more, based on the total amount of the compounds of formulae (II) and (III). It is preferred in view of prevention of the bubbling and increase of the dispersing rate that the nonionic surface active agent and the compounds of formulae (II) and (III) are dispersed in a solution having the anionic surface active agent completely dissolved or dispersed in pure water. The thus prepared aqueous dispersion is coated on a sheet to produce a color developer sheet.

The substituted or unsubstituted benzoic acid salts represented by formulae (I) and (II) are, in general, crystalline solid. Examples include zinc, aluminum, calcium, cobalt, strontium or magnesium salts of benzoic acid or substituted benzoic acids such as salicylic acid, isophthalic acid, terephthalic acid, m-hydroxybenzoic acid, p-hydroxybenzoic acid, protocatechuic acid, 2,3-dihydroxybenzoic acid, β-resorcylic acid, 2,5-dihydroxybenzoic acid, 2,6-dihydroxybenzoic acid, 3,5-dihydroxybenzoic acid, 2,3,4-trihydroxybenzoic acid, gallic acid, o-chlorobenzoic acid, p-chlorobenzoic acid, 2,4-dichlorobenzoic acid, 2-fluorobenzoic acid, 3-fluorobenzoic acid, m-bromobenzoic acid, p-bromobenzoic acid, 5-bromo-2-hydroxybenzoic acid, o-iodobenzoic acid and p-iodobenzoic acid.

Examples of substituted or unsubstituted salicylic acid salt represented by formula (II) wherein $R_6$ is a hydroxy group including zinc, magnesium, calcium, aluminum, nickel, cobalt, iron or strontium salts of substituted salicylic acids such as 3-phenylsalicylic acid, 5-phenylsalicylic acid, 3-benzylsalicylic acid, 5-benzylsalicylic acid, 3-(α-methylbenzyl)salicylic acid, 5- (α-methylbenzyl)salicylic acid, 3-(α,α-dimethylbenzyl)-salicylic acid, 5-(α,α-dimethylbenzyl)salicylic acid, 5(α-α-methyl-α-ethylbenzyl)salicylic acid, 5-(α-methyl-α-propylbenzyl)salicylic acid, 5-(α,α-dimethylphenylethyl)salicylic acid, 3-methyl-5-phenylsalicylic acid, 5-methyl-3-phenylsalicylic acid, 3-isopropyl-5-phenylsalicylic acid, 5-isopropyl-3-phenylsalicylic acid, 3-tert-butyl-5-phenylsalicylic acid, 5-tert-butyl-3-phenylsalicylic acid, 5-tert-octyl-3-phenylsalicylic acid, 5-nonyl-3-phenyl-salicylic acid, 5-cyclohexyl-3-phenylsalicylic acid, 3-cyclohexyl-5-phenylsalicylic acid, 3-methyl-5-benzylsalicylic acid, 5-methyl-3-benzylsalicylic acid, 5-ethyl-3-benzylsalicylic acid, 3-n-propyl-5-benzylsalicylic acid, 5-n-propyl-3-benzylsalicylic acid, 3-isopropyl-5-benzylsalicylic acid, 5-isopropyl-3-benzylsalicylic acid, 3-sec-butyl-5-benzylsalicylic acid, 5-sec-butyl-3-benzylsalicylic acid, 3-tert-butyl-5-benzylsalicylic acid, 5-tert-butyl-3-benzylsalicylic acid, 3-tert-amyl-5-benzylsalicylic acid, 5-tert-amyl-3-benzylsalicylic acid, 3-tert-octyl-5-benzylsalicylic acid, 5-tert-octyl-3-benzylsalicylic acid, 5-nonyl-3-benzylsalicylic acid, 5-dodecyl-3-benzylsalicylic acid, 5-cyclohexyl-3-benzylsalicylic acid, 3-methyl-5-(α-methylbenzyl)salicylic acid, 5-methyl-3-(α-methylbenzyl)salicylic acid, 5-ethyl-3-(α-methylbenzyl)salicylic acid, 3-isopropyl-5-(α-methylbenzyl)salicylic acid, 5-isopropyl-3-(α-methylbenzyl)-salicylic acid, 3-sec-butyl-5-(α-methylbenzyl)salicylic acid, 5-sec-butyl-3-(αmethylbenzyl)salicylic acid, 3-tert-butyl-5-(α-methylbenzyl)salicylic acid, 5-tert-butyl-3-(α-methylbenzyl)salicylic acid, 3-tert-amyl-5-(α-methylbenzyl)salicylic acid, 5-tert-amyl-3-(α-methylbenzyl)salicylic acid, 5-tert-octyl-3-(α-methylbenzyl)salicylic acid, 5-nonyl-3-(α-methylbenzyl)salicylic acid, 5-dodecyl-3-(α-methylbenzyl)salicylic acid, 5-cyclohexyl-3-(α-methylbenzyl)salicylic acid, 3-methyl-5-(α,α-dimethylbenzyl)salicylic acid, 5-methyl-3-(α,α-dimethylbenzyl)salicylic acid, 3-ethyl-5-(α,α-dimethylbenzyl)salicylic acid, 5-ethyl-3-(α,α-dimethylbenzyl)salicylic acid, 5-n-propyl-3-(α,α-dimethylbenzyl)salicylic acid, 3-isopropyl-5-(α,α-dimethylbenzyl)-salicylic acid, 5-isopropyl-3-(α,α-dimethylbenzyl)salicylic acid, 3-sec-butyl-5-(α,α-dimethylbenzyl)salicylic acid, 5-sec-butyl-3-(α,α-dimethylbenzyl)salicylic acid, 3-tert-butyl-5-(α,α-dimethylbenzyl)salicylic acid, 5-tert-butyl-3-(α,α-dimethylbenzyl)salicylic acid, 3-tert-amyl-5-(α,α-dimethylbenzyl)salicylic acid, 5-tert-amyl-3-(α,α-dimethylbenzyl)salicylic acid, 5-tert-octyl-3-(α,α-dimethylbenzyl)salicylic acid, 5- nonyl-3-(α,α-dimethylbenzyl)salicylic acid, 5-dodecyl-3-(α,α-dimethylbenzyl)salicylic acid, 5-cyclohexyl-3-(α,α-dimethylbenzyl)salicylic acid, 3-methyl-5-(α-methyl-α-ethylbenzyl)-salicylic acid, 3,5-diphenylsalicylic acid, 3,5-dibenzylsalicylic acid, 3,5-di(α-methylbenzyl)salicylic acid, 3,5-di(α,α-dimethylbenzyl)salicylic acid, 3-phenyl-5-benzylsalicylic acid, 5-phenyl-3-benzylsalicylic acid, 3-phenyl-5-(α-methylbenzyl)salicylic acid, 5-phenyl-3-(α-methylbenzyl)salicylic acid, 3-phenyl-5-(α,α-dimethylbenzyl)salicylic acid, 5-phenyl-3-(α,α-dimethylbenzyl)-salicylic acid, 3-benzyl-5-(α-methylbenzyl)salicylic acid, 5-benzyl-3-(α-methylbenzyl)salicylic acid, 3-benzyl-5-(α,α-dimethylbenzyl)salicylic acid, 5-benzyl-3-(α,α-dimethylbenzyl)salicylic acid, 3-(α-methylbenzyl)-5-(α,α-dimethylbenzyl)salicylic acid, 5-(α-methylbenzyl)-3-(α,α-dimethylbenzyl)salicylic acid, 3-(4-methylbenzyl)salicylic acid, 5-(4-methylbenzyl)salicylic acid, 3,5-di(4-methylbenzyl)salicylic acid, 3-(2-methylbenzyl)salicylic acid, 5-(2-methylbenzyl)salicylic acid, 3,5-di(2-methylbenzyl)salicylic acid, 5-(3-methylbenzyl)-salicylic acid, 3,5-di(3-methylbenzyl)salicylic acid, 5-[α-methyl-4'-(α-methylbenzyl)benzyl]salicylic acid, 5-[4'-(2,4,6-trimethylbenzyl)benzyl]salicylic acid, 1-hydroxy-2-carboxy-4-(α-methylbenzyl)naphthalene, 2-hydroxy-1-carboxy-4-(α-methylbenzyl)naphthalene, 1-hydroxy-2-carboxy-4-benzylnaphthalene, 1-hydroxy-2-carboxy-4-(α,α-dimethylbenzyl)naphthalene, and 1-(α-methylbenzyl)-2-hydroxy-3-carboxynaphthalene.

As novolak type phenol resins represented by formula (III), polycondensates of formaldehyde with phenols (e.g., phenol, p-hydroxyphenol, p-methylphenol, p-ethylphenol, p-sec-butylphenol, p-tert-butylphenol, p-phenylphenol, p-benzylphenol, p-(4-hydroxybenzyl)-phenol, p-(α-methylbenzyl)phenol, p-(α,α-dimethylbenzyl)phenol and bisphenol A) can be used. Of these, preferred are novolak type phenol resins of formula (III) wherein $R_{11}$ is one of the following groups:

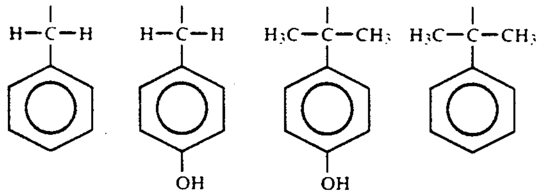

The addition of the novolak type phenol resin in the color developer composition is advantageous in that the phenol resin becomes soft when heated after color development, and imparts gloss to the image surface.

Examples of anionic surface active agents which can be used in the present invention include alkali salts of alkylbenzenesulfonic acids, alkylnaphthalenesulfonic acids, alkylsulfosuccinic acids, alkylsulfuric acid esters, alkyl diphenyl ether disulfonic acids or polyoxyethylene alkylsulfuric acid esters, and polycarboxylic acid type high molecular weight surface active agents, with sodium alkylsulfosuccinates being preferred, or a mixture thereof. Of these, sodium dioctylsulfosuccinate is particularly preferred as it is inexpensive, exhibits good deforming property and minimizes thixotropic properties. Sodium laurylsulfate, sodium dodecylbenzenesulfonate, sodium octylnaphthalenesulfonate, sodium polyoxyethylene lauryl ether sulfate and the like may also be used alone or in combination.

As the nonionic surface active agents, there may be mentioned polyvinyl alcohol, modified polyvinyl alcohols, polyacrylamide, modified polyacrylamides, and polyoxyethylene derivatives such as polyoxyethylene lauryl ether, polyoxyethylene higher alcohol ethers, polyoxyethylene octylphenyl ether, polyoxyethylene nonylphenyl ether, polyoxyethylene sorbitan monolaurate, polyoxyethylene sorbitan monostearate and polyoxyethylene sorbitan monooleate.

The color developer compositions containing the ingredients as described above are inexpensive, exhibit excellent color developability, and provide images with minimized yellowing and fading. Further, since the compositions of the present invention do not suffer from bubbling when dispersed in water, they can be easily coated to obtain color developer sheets. Furthermore, the color developer sheets become glossy upon heating after image recording.

The present invention is further explained with reference to the following Examples, but the present invention should not be construed as being limited thereto.

EXAMPLE 1

Eight grams of an alcohol solution containing sodium dioctylsulfosuccinate (effective ingredient: 80 wt%) was completely dissolved in 800 g of pure water, to which 20 g of a 20 wt% aqueous solution of polyvinyl alcohol (polymerization degree: 500, saponification degree: about 88%) was then mixed. The mixture and 600 g of zinc salicylate were charged in a ball mill and ground for 24 hours. Thereafter, 400 g of a 7 wt% aqueous solution of polyethylene oxide ("PEO-8", produced by Seitetsu Kagaku Co., Ltd.) was mixed as a binder. The thus prepared aqueous dispersion of color developer composition was coated on a paper (basis weight: 127.9 $g/m^2$, "high Grade Dalart A", produced by Mitsubishi Paper Mills, Ltd.) using a bar coater (No. 28, diameter: ¼ inch) and then dried at 80° C.

EXAMPLE 2

Ten grams of an alcohol solution containing sodium dioctylsulfosuccinate (effective ingredient: 80 wt%) was completely dissolved in 1000 g of pure water, to which 5 g of polyoxyethylene octylphenyl ether ("Emulgen 800 Series", produced by Kao Corp.) was then mixed. The resulting mixture and 600 g of zinc benzoate were charged in a ball mill and ground for 24 hours. Thereafter, 200 g of a 15 wt% aqueous solution of polyvinyl alcohol ("PVA 200", produced by Kurare Co., Ltd.) was added as a binder. The thus prepared aqueous dispersion of color developer composition was coated on a paper (basis weight: 127.9 $g/m^2$, "high Grade Dalart A", produced by Mitsubishi Paper Mills, Ltd.) and dried in the same manner as in Example 1.

EXAMPLE 3

Ten grams of an alcohol solution containing sodium dioctylsulfosuccinate (effective ingredient 80 wt%) was completely dissolved in 1000 g of pure water, to which 5 g of polyoxyethylene nonylphenyl ether ("Emulgen 900 Series", produced by Kao Corp.) was then mixed. The mixture and 600 g of zinc β-resorcylic acid were charged in a ball mill and ground for 24 hours. Thereafter, 200 g of a 15 wt% aqueous solution of polyvinyl alcohol (PVA 220) was mixed as a binder. The thus prepared aqueous dispersion of color developer composition was coated on a paper (basis weight: 127.9 $g/m^2$, "high Grade Dalart A", produced by Mitsubishi Paper Mills. Ltd.) and dried in the same manner as in Example 1.

COMPARATIVE EXAMPLE 1

Eight grams of an alcohol solution containing sodium dioctylsulfosuccinate (effective ingredient: 80 wt%) was completely dissolved in 800 g of pure water, to which 20 g of a 20 wt% aqueous solution of polyvinyl alcohol (polymerization degree: 500, saponification degree: about 88 %) was then mixed. The mixture and 600 g of zinc 3,5-di-tertbutylsalicylate were charged in a ball mill and ground for 24 hours. Then, 400 g of a 7 wt% aqueous solution of polyethylene oxide ("PEO-8", produced by Seitetsu Kagaku Co., Ltd.) was added as a binder to obtain an aqueous dispersion of color developer composition. However, the aqueous dispersion suffered from significant bubbling and could not be used in preparation of color developer sheets.

COMPARATIVE EXAMPLE 2

Ten grams of an alcohol solution containing sodium dioctylsulfosuccinate (effective ingredient: 80 wt%) was completely dissolved in 1000 g of pure water, which was charged in a ball mill together with 600 g of zinc 3,5-di-tert-butylsalicylate, followed by grinding for 24 hours. Then, 200 g of a 15wt% aqueous solution of polyvinyl alcohol (PVA 220) was mixed as a binder to obtain an aqueous dispersion of color developer composition, which was coated on a paper (basis weight: 127.9 g/m$^2$, "high Grade Dalart A", produced by Mitsubishi Paper Mills, Ltd.) and dried in the same manner as in Example 1.

COMPARATIVE EXAMPLE 3

Eight grams of an alcohol solution containing sodium dioctylsulfosuccinate (effective ingredient: 80 wt%) was completely dissolved in 800 g of pure water, which was then charged in a ball mill with 600 g of zinc salicylate and ground for 24 hours. Then, 400 g of a 7 wt% aqueous solution of polyethylene oxide (PEO-8) was added as a binder to obtain an aqueous dispersion of color developer composition, which was coated on a coated paper and dried in the same manner as in Example 1.

COMPARATIVE EXAMPLE 4

Ten grams of an alcohol solution containing sodium dioctylsulfosuccinate (effective ingredient: 80 wt%) was completely dissolved in 1000 g of pure water, to which 5 g of polyoxyethylene octylphenyl ether (Emulgen 800 Series) was then mixed. The mixture and 600 g of zinc 3,5-di(α-methylbenzyl)salicylate were charged in a ball mill and ground for 24 hours. Thereafter, 200 g of a 15 wt% aqueous solution of polyvinyl alcohol (PVA 220) was added as a binder to obtain an aqueous dispersion of color developer composition. However, the aqueous dispersion suffered from significant bubbling and could not be used in preparation of color developer sheets.

COMPARATIVE EXAMPLE 5

Seven grams of an alcohol solution containing sodium dioctylsulfosuccinate (effective ingredient: 80 wt%) was dissolved in 1000 g of pure water. The solution and 600 g of a novolak resin of a mixture of phenol and p-tert-butylphenol ("CKM-2103", produced by Union Carbide Corp.) were charged in a ball mill and ground for 24 hours, to which 200 g of a 15 wt% aqueous solution of polyvinyl alcohol (PVA 220) was added as a binder. The thus prepared aqueous dispersion of color developer composition was coated on a paper (basis weight: 127.9 g/m$^2$, "high Grade Dalart A", produced by Mitsubishi Paper Mills, Ltd.) and dried in the same manner as in Example 1.

COMPARATIVE EXAMPLE 6

Two grams of a polycarboxylic acid type high molecular weight surface active agent ("Demol EP", produced by Kao Corp.) and 2 g of a polyoxyethylene derivative ("Emulgen A-500", produced by Kao Corp.) were dissolved in 1000 g of pure water, which was then charged in a ball mill with 600 g of a novolak resin of p-phenylphenol ("PS-2880", produced by Gun-ei Kagaku Co., Ltd.) and ground for 24 hours. Then, 200 g of a 15 wt% aqueous solution of polyvinyl alcohol (PVA 220) was added as a binder to obtain an aqueous dispersion of color developer composition which was coated on a coated paper and dried in the same manner as in Example 1.

Properties of the color developer sheets obtained in Examples 1 to 3 and Comparative Examples 2, 3, 5 and 6 were measured by the following procedures (i) to (vi) and the results are shown in Table 1. However, the dispersions of the Comparative Examples 1 and 4 could not be measured because they suffered from bubbling.

(i) Initial Color-developed Density

A photosensitive and pressure-sensitive microcapsule sheet (Product No. 5001J, R-630, produced by The Mead Corporation) as described in JP-A-62-150242 was put on the above-prepared color developer sheet in the face-to face configuration with respect to their coated surfaces, and they were passed through a calender roll with linear pressure of 50 kg/cm at 20° C. and 50% RH to effect color development. The color-developed density after one minute was measured using a densitometer ("RD-914", produced by Macbeth Co., Ltd.).

(ii) Color-developed Density After Heat-fixation

A color-developed sheet which had been subjected to color development as in the above procedure (i) was put in an oven at 150° C. for one minute to perform heat-fixation, and the color-developed density was measured using a densitometer (RD-914).

(iii) Light-fastness

An unused color developer sheet was exposed to light for 4 hours using a carbon arc fade meter (produced by Suga Shikenki Co., Ltd.), and yellowness index of the sheet was measured with a multi-light source spectral colorimeter (MSC-2 type, produced by Suga Shikenki Co., Ltd.).

(iv) Heat Resistance

An unused color developer sheet was allowed to stand at 80° C. in a dark room without controlling humidity, and yellowness index of the sheet was measured using a colorimeter as in the procedure (iii).

(v) Resistance to Yellowing

An unused color developer sheet was allowed to stand at 25° C. and 50% RH for 150 days in a dark room, and yellowness index of the sheet was measured using a colorimeter as in the procedure (iii).

(vi) Storage Stability

The aqueous dispersions of color developer compositions prepared in the above Examples and Comparative Examples were stored for 30 days, and then the dispersions were observed by naked eyes. In Table 1, A means no changes occurred in the dispersion; B means slight separation occurred in the dispersion but causing no problems when stirred; and C means complete separation occurred in the dispersion so that it does not revert to its original state even if stirred.

EXAMPLE 4

Ten grams of an alcohol solution containing sodium dioctylsulfosuccinate (effective ingredient: 80 wt%) was completely dissolved in 1000 g of pure water. The solution was charged in a ball mill together with 20 g of a 20 wt% aqueous solution of polyvinyl alcohol (polymerization degree: 500, saponification degree: about 88 %), 300 g of a novolak resin of p-tert-butylphenol ("CKM-2432", produced by Union Carbide Corp.) and 300 g of zinc salicylate, and they were ground for 24 hours. Then, 200 g of a 15 wt% aqueous solution of polyvinyl alcohol (PVA 220) was added as a binder to obtain an aqueous dispersion of color developer composition which was coated on a paper (basis weight: 127.9 $g/m^2$, "high Grade Dalart A", produced by Mitsubishi Paper Mills, Ltd.)and dried in the same manner as in Example 1.

EXAMPLE 5

Ten grams of an alcohol solution containing sodium dioctylsulfosuccinate (effective ingredient: 80 wt%) was completely dissolved in 1000 g of pure water. The solution was charged in a ball mill together with 2 g of a polyoxyethylene derivative ("Emulgen A-500"), 300 g of a novolak resin of p-phenylphenol (PS-2880) and 300 g of zinc benzoate, and they were ground for 24 hours. Then, 200 g of a 15 wt% aqueous solution of polyvinyl alcohol (PVA 220) was added as a binder to obtain an aqueous dispersion of color developer, which was then coated on a paper (basis weight: 127.9 $g/m^2$, "high Grade Dalart A", produced by Mitsubishi Paper Mills, Ltd.) and dried in the same manner as in Example 1.

EXAMPLE 6

Ten grams of an alcohol solution containing sodium dioctylsulfosuccinate (effective ingredient: 80 wt%) was completely dissolved in 1000 g of pure water. The solution was charged in a ball mill with 300 g of a novolak resin of a mixture of phenol and p-tert-butylphenol (CKM-2103) and 300 g of zinc β-resorcylic acid and ground for 24 hours. Then, 200 g of a 15 wt% aqueous solution of polyvinyl alcohol (PVA 220) was added as a binder to obtain an aqueous dispersion of color developer composition which was coated on a paper (basis weight: 127.9 $g/m^2$, "high Grade Dalart A", produced by Mitsubishi Paper Mills, Ltd.) and dried in the same manner as in Example 1.

REFERENCE EXAMPLE

Ten grams of an alcohol solution containing sodium dioctylsulfosuccinate (effective ingredient: 80 wt%) was completely dissolved in 1000 g of pure water. The solution was charged in a ball mill with 20 g of a 20 wt% aqueous solution of polyvinyl alcohol (polymerization degree: 500, saponification degree: about 88%) and 600 g of zinc salicylate and ground for 24 hours. Thereafter, 200 g of a 15 wt% aqueous solution of polyvinyl alcohol (PVA 200) was added as a binder to obtain an aqueous dispersion of color developer composition which was coated on a coated paper and dried in the same manner as in Example 1.

COMPARATIVE EXAMPLE 7

The grams of an alcohol solution containing sodium dioctylsulfosuccinate (effective ingredient: 80 wt%) was completely dissolved in 1000 g of pure water. The solution and 600 g of a novolak resin of p-tert-butylphenol (CKM-2432) were charged in a ball mill and ground for 24 hours. Then, 200 g of a 15 wt% aqueous solution of polyvinyl alcohol (PVA 220) was added as a binder to obtain an aqueous dispersion of color developer composition which was coated on a coated paper and dried in the same manner as in Example 1.

COMPARATIVE EXAMPLE 8

Ten grams of an alcohol solution containing sodium dioctylsulfosuccinate (effective ingredient: 80 wt%) was completely dissolved in 1000 g of pure water. The solution was charged in a ball mill together with 2 g of a polyoxyethylene derivative (Emulgen A-500) and 600 g of a novolak resin of p-phenylphenol (PS-2880) and ground for 24 hours. Thereafter, 200 g of a 15 wt% aqueous solution of polyvinyl alcohol (PVA 220) was mixed as a binder to obtain an aqueous dispersion of color developer composition which was coated on a coated paper and dried in the same manner as in Example 1.

The color developer sheets prepared in Examples 4 to 6, Reference Example and Comparative Examples 7 and 8 were subjected to the same tests as in Example 1 and further to the following test with respect to gloss of the sheet.

The gloss of the color developer sheet which had been processed in the same manner as in the procedure (ii) for measurement of color-developed density after heat-fixation was measured at the angle of 75 using a varied-angle gloss meter (produced by Suga Shikenki Co., Ltd.). When the same test was performed with the color developer sheets prepared in Examples 2 and 3 and Comparative Examples 2, 5, 6 and 7, their results were 7.2, 27.8, less than 5, 82.9, 86.9 and 74.0, respectively.

The results obtained are shown in Table 2 below.

EXAMPLE 7

Ten grams of an alcohol solution containing sodium dioctylsulfosuccinate (effective ingredient: 80 wt%) was dissolved in 1000 g of pure water. The solution was charged in a ball mill with 300 g of a novolak resin of p-tert-butylphenol (CKM-2432) and 300 g of zinc 3,5-di-tert-butylsalicylate and ground for 24 hours. Then, 200 g of a 15 wt% aqueous solution of polyvinyl alcohol (PVA 220) was mixed as a binder to obtain an aqueous dispersion of color developer composition which was coated on a paper (basis weight: 127.9 $g/m^2$, "high Grade Dalart A", produced by Mitsubishi Paper Mills, Ltd.) and dried in the same manner as in Example 1.

EXAMPLE 8

Seven grams of an alcohol solution containing sodium dioctylsulfosuccinate (effective ingredient: 80 wt%) was dissolved in 1000 g of pure water. The solution was charged in a ball mill together with 350 g of a novolak resin of a mixture of phenol and p-tert-butylphenol (CKM-2103), 125 g of zinc 3-phenylsalicylate and 125 g of zinc 5-phenylsalicylate and ground for 24 hours. Thereafter, 200 g of a 15 wt% aqueous solution of polyvinyl alcohol (PVA 200) was mixed as a binder to obtain an aqueous dispersion of color developer composition which was coated on a paper (basis weight: 127.9 g/m$^2$, "high Grade Dalart A", produced by Mitsubishi Paper Mills, Ltd.) and dried in the same manner as in Example 1.

EXAMPLE 9

Two grams of a polycarboxylic acid type high molecular weight surface active agent (Demol EP) and 2 g of a polyoxyethylene derivative (Emulgen A-500) were dissolved in 1000 g of pure water. The solution was charged in a ball mill together with 400 g of a novolak resin of p-phenylphenol (PS-2880) and 200 g of zinc 3,5-di(α-methylbenzyl)salicylate and ground for 24 hours. Then, 200 g of a 15 wt% aqueous solution of polyvinyl alcohol (PVA 220) was mixed as a binder to obtain an aqueous dispersion of color developer composition which was coated on a paper (basis weight: 127.9 g/m$^2$, "high Grade Dalart A", produced by Mitsubishi Paper Mills, Ltd.) and dried in the same manner as in Example 1.

COMPARATIVE EXAMPLE 9

Seven grams of an alcohol solution containing sodium dioctylsulfosuccinate (effective ingredient: 80 wt%) was dissolved in 1000 g of pure water. The solution was charged in a ball mill with 300 g of zinc 3-phenylsalicylate and 300 g of zinc 5-phenylsalicylate and ground for 24 hours. Then, 200 g of a 15 wt% aqueous solution of polyvinyl alcohol (PVA 220) was mixed as a binder to obtain an aqueous dispersion of color developer composition which was coated on a paper (basis weight: 127.9 g/m$^2$, "high Grade Dalart A", produced by Mitsubishi Paper Mills, Ltd.) and dried in the same manner as in Example 1.

COMPARATIVE EXAMPLE 10

Two grams of a polycarboxylic acid type high molecular weight surface active agent (Demol EP) and 2 g of a polyoxyethylene derivative (Emulgen A-500) were dissolved in 1000 g of pure water. The solution and 600 g of zinc 3,5-di(α-methylbenzyl)salicylate were charged in a ball mill and ground for 24 hours. Then, 200 g of a 15 wt% aqueous solution of polyvinyl alcohol (PVA 220) was mixed as a binder to obtain an aqueous dispersion of color developer composition. However, the dispersion suffered from bubbling and could not be used for preparation of color developer sheets.

Using the color developer sheets prepared in Examples 7 to 9 and Comparative Example 9, the same tests as in Example 4 were performed, and the results obtained are shown in Table 3.

It is apparent from the above description that the color developer compositions of the present invention have high color-developability, provide color developer sheets having excellent shelf life with respect to light-fastness and yellowing and also exhibit good storage stability in the form of aqueous dispersion, allowing them to be supplied and put on the market in the form of aqueous dispersion, while conventional color developers are supplied in the form of powder and have defects in handling properties. The color developer compositions of the present invention are freed from dust problems, troublesome handling and reprocessing of particles, which are developers. Thus, the color developer compositions of the present invention are apparently advantageous in the hygienic and economical viewpoints.

In addition, the color developer sheets of the present invention can provide a smooth surface upon heat treatment due to softening of the phenol resin component contained therein, imparting gloss to the sheet, so that not only is the commercial value of the sheet increased but also water resistance and chemical resistance are improved and further alteration of documents can be prevented.

The substituted or unsubstituted benzoic acid salt having the formula (I) is preferably used in 80 to 99.8 wt%, and the mixture of (II) and (III) ar preferably used in 30 to 70 wt% for the former and in 70 to 30 wt% for the latter.

While the invention has been described in detail and with reference to specific embodiments thereof, it will be apparent to one skilled in the art that various changes and modifications can be made therein without departing from the spirit and scope thereof.

TABLE 1

| Example No. | Initial color-developed density | Color-developed density after heat-fixation | Light-fastness | Heat resistance | Resistance to yellowing | Storage stability |
|---|---|---|---|---|---|---|
| 1 | 1.23 | 1.65 | 6.9 | 16.1 | 3.6 | B |
| 2 | 0.95 | 1.57 | 6.0 | 15.0 | 3.5 | A |
| 3 | 1.11 | 1.62 | 6.8 | 14.7 | 3.5 | A |
| Comp. Ex. 2 | 0.98 | 1.57 | 7.3 | 16.5 | 3.6 | B |
| Comp. Ex. 3 | 1.27 | 1.71 | 6.7 | 14.1 | 3.5 | C |
| Comp. Ex. 5 | 0.64 | 0.84 | 29.7 | 41.8 | 7.0 | A |
| Comp. Ex. 6 | 0.77 | 1.05 | 30.3 | 40.2 | 7.4 | B |

TABLE 2

| Example No. | Initial color-developed density | Color-developed density after heat-fixation | Gloss | Light-fastness | Heat resistance | Resistance to yellowing | Storage Stability |
|---|---|---|---|---|---|---|---|
| 4 | 0.92 | 1.70 | 55.7 | 12.4 | 20.7 | 3.9 | A |
| 5 | 0.83 | 1.63 | 79.4 | 15.7 | 23.1 | 4.1 | A |
| 6 | 0.79 | 1.65 | 77.7 | 16.0 | 21.5 | 4.1 | A |
| Ref. Ex. | 1.25 | 1.69 | 22.3 | 6.7 | 15.7 | 3.7 | B |
| Comp. Ex. 7 | 0.59 | 0.81 | 74.0 | 24.8 | 37.6 | 5.3 | A |
| Comp. Ex. 8 | 0.75 | 1.04 | 85.7 | 29.3 | 40.1 | 6.9 | B |

TABLE 3

| Example No. | Initial color-developed density | Color-developed density after heat-fixation | Gloss | Light-fastness | Heat resistance | Resistance to yellowing | Storage Stability |
|---|---|---|---|---|---|---|---|
| 7 | 0.81 | 1.26 | 46.0 | 11.7 | 19.3 | 4.1 | A |
| 8 | 1.01 | 1.45 | 71.3 | 15.6 | 21.7 | 4.4 | A |
| 9 | 1.23 | 1.52 | 78.5 | 16.1 | 21.9 | 4.3 | A |
| Comp. Ex. 9 | 1.07 | 1.61 | 63.2 | 8.5 | 18.1 | 4.0 | C |

What is claimed is:

1. A color developer composition comprising, as a main component, a substituted or unsubstituted benzoic acid salt represented by formula (I):

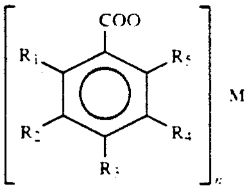

(I)

wherein $R_1$ to $R_5$ which may be the same or different, each represents a hydrogen atom, a halogen atom, a hydroxy group, or a carboxy group; M represents zinc, magnesium, calcium, aluminum, iron, cobalt, nickel, strontium, or basic ions thereof; and n is the valence of M; an anionic surface active agent selected from the group consisting of a polycarboxylic acid high molecular weight surface active agent, an alkali salt of one of alkylbenzenesulfonic acids, alkylnaphthalenesulfonic acids, alkylsulfosuccinic acids, alkylsulfuric acid esters, alkyl diphenyl ether disulfonic acids and polyoxyethylene alkylsulfuric acid esters, and mixtures thereof, wherein said anionic surface active agent is contained in an amount of 0.1 to 10 wt% based on the amount of the substituted or unsubstituted benzoic acid salt; and a nonionic surface active agent.

2. A color developer composition as in claim 1, wherein said nonionic surface active agent has a molecular weight of 400 or more and is contained in an amount of 0.1 to 10 wt% based on the amount of the substituted or unsubstituted benzoic acid salt.

3. A color developer composition as in claim 1, wherein said substituted or unsubstituted benzoic acid is selected from the group consisting of zinc, aluminum, calcium, cobalt, strontium or magnesium salts of benzoic acid, salicylic acid, isophthalic acid, terephthalic acid, m-hydroxybenzoic acid, p-hydroxybenzoic acid, protocatechuic acid, 2,3-dihydroxybenzoic acid, β-resorcylic acid, 2,5-dihydroxybenzoic acid, 2,6-dihydroxybenzoic acid, 3,5-dihydroxybenzoic acid, 2,3,4-trihydroxybenzoic acid, gallic acid, o-chlorobenzoic acid, p-chlorobenzoic acid, 2,4-dichlorobenzoic acid, 2-fluorobenzoic acid, 3-fluorobenzoic acid, m-bromobenzoic acid, p-bromobenzoic acid, 5-bromo-2-hydroxybenzoic acid, o-iodobenzoic acid and p-iodobenzoic acid.

4. A color developer composition comprising (i) a substituted or unsubstituted benzoic acid salt represented by formula (II):

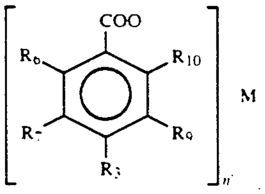

(II)

wherein $R_6$ to $R_{10}$ which may be the same or different, each represents a hydrogen atom, a halogen atom, a hydroxy group or a carboxy group, provided that when $R_6$ is a hydroxy group, $R_7$ to $R_{10}$ each may further represent an alkyl group having 1 to 9 carbon atoms, a cycloalkyl group, a phenyl group or an aralkyl group and the adjacent two groups of $R_7$, $R_8$, $R_9$ and $R_{10}$ may bond to form a ring; M' represents zinc, magnesium, calcium, aluminum, iron, cobalt, nickel, strontium or basic ions thereof; and n' is an integer of 1 to 3; and (ii) a novolak phenol resin represented by formula (III):

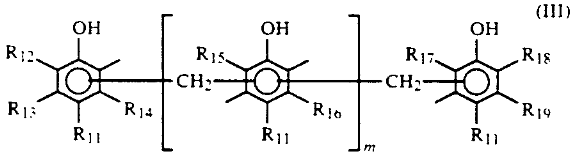

(III)

wherein $R_{11}$ to $R_{19}$ which may be the same or different, each is selected from the group consisting of a benzyl group, a p-hydroxybenzyl group, an α,α-dimethylbenzyl group, and a p-hydroxy-α,α-dimethylbenzyl group; and m is a natural number of 1 to 9.

5. A color developer composition as in claim 4, wherein $R_{11}$ is a benzyl group.

6. A color developer composition as in claim 4, wherein $R_{11}$ is a p-hydroxybenzyl group.

7. A color developer composition as in claim 4, wherein $R_{11}$ is an α,α-dimethylbenzyl group.

8. A color developer composition as in claim 4, wherein $R_{11}$ is a p-hydroxy-α,α-dimethylbenzyl group.

9. A color developer composition as in claim 4, which further comprises an anionic surface active agent and a nonionic surface active agent.

10. A color developer composition as in claim 9, wherein said anionic surface active agent is a polycarboxylic acid high molecular weight surface active agent, an alkali salt of one of alkylbenzenesulfonic acids, alkylnaphthalenesulfonic acids, alkylsulfosuccinic acids, alkylsulfuric acid esters, alkyl diphenyl ether disulfonic acids and polyoxyethylene alkylsulfuric acid esters, or a mixture thereof, and is contained in an amount of 0.1 to 10 wt% based on the total amount of the compounds of formulae (II) and (III).

11. A color developer composition as in claim 9, wherein said nonionic surface active agent has a molecular weight of 400 or more and is contained in an amount of 0.1 to 10 wt% based on the total amount of the compounds of formulae (II) and (III).

12. A color developer composition comprising (i) a substituted or unsubstituted benzoic acid salt represented by formula (II):

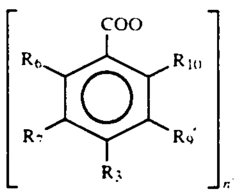

(II)

wherein $R_6$ to $R_{10}$ which may be the same or different, each represents a hydrogen atom, a halogen atom, a hydroxy group or a carboxy group, provided that when $R_6$ is a hydroxy group, $R_7$ to $R_{10}$ each may further represent an alkyl group having 1 to 9 carbon atoms, a cycloalkyl group, a phenyl group or an aralkyl group and the adjacent two groups of $R_7$, $R_8$, $R_9$ and $R_{10}$ may bond to form a ring; M' represents zinc, magnesium, calcium, aluminum, iron, cobalt, nickel, strontium or basic ions thereof; and n' is an integer of 1 to 3; and (ii) a novolak phenol resin represented by formula (III):

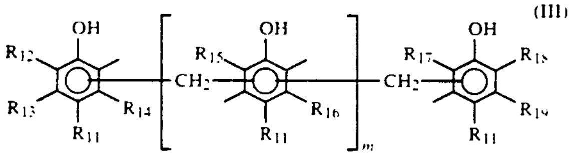

(III)

wherein $R_{11}$ to $R_{19}$ which may be the same or different, each represents a hydrogen atom, a halogen atom, an alkyl group having 1 to 9 carbon atoms, a cycloalkyl group, a phenyl group, or an aralkyl group; and m is a natural number of 1 to 9; an anionic surface active agent selected from the group consisting of a polycarboxylic acid high molecular weight surface active agent, an alkali slat of one of alkylbenzenesulfonic acids, alkylnaphthalenesulfonic acids, alkylsulfosuccinic acids, alkylsulfuric acid esters, alkyl diphenyl ether disulfonic acids and polyoxyethylene alkylsulfuric acid esters, and mixtures thereof, and wherein said anionic surface active agent is contained in an amount of 0.1 to 10 wt% based on the total amount of the compounds of formulae (II) and (III); and a nonionic surface active agent.

13. A color developer composition comprising (i) a substituted or unsubstituted benzoic acid salt represented by formula (II):

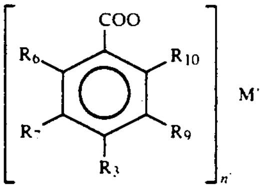

(II)

wherein $R_6$ to $R_{10}$ which may be the same or different, each represents a hydrogen atom, a halogen atom, a hydroxy group or a carboxy group, provided that when $R_6$ is a hydroxy group, $R_7$ to $R_{10}$ each may further represent an alkyl group having 1 to 9 carbon atoms, a cycloalkyl group, a phenyl group or an aralkyl group and the adjacent two groups of $R_7$, $R_8$, $R_9$ and $R_{10}$ may bond to form a ring; M' represents zinc, magnesium, calcium, aluminum, iron, cobalt, nickel, strontium or basic ions thereof; and n' is an integer of 1 to 3; and (ii) a novolak phenol resin represented by formula (III):

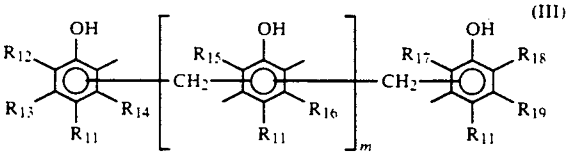

(III)

wherein $R_{11}$ to $R_{19}$ which may be the same or different, each represents a hydrogen atom, a halogen atom, an alkyl group having 1 to 9 carbon atoms, a cycloalkyl group, a phenyl group, or an aralkyl group; and m is a natural number of 1 to 9; an anionic surface active agent and a nonionic surface active agent; wherein said nonionic surface active agent has a molecular weight of 400 or more and is contained in an amount of 0.1 to 10 wt% based on the total amount of the compounds of formulae (II) and (III).

* * * * *